(12) United States Patent
Ulrich

(10) Patent No.: US 12,086,789 B2
(45) Date of Patent: *Sep. 10, 2024

(54) POINT OF INTERACTION DEVICE EMULATION FOR PAYMENT TRANSACTION SIMULATION

(71) Applicant: Worldpay, LLC, Symmes Township, OH (US)

(72) Inventor: Chance Ulrich, Alpharetta, GA (US)

(73) Assignee: Worldpay, LLC, Symmes Township, OH (US)

( * ) Notice: Subject to any disclaimer, the term of this patent is extended or adjusted under 35 U.S.C. 154(b) by 166 days.

This patent is subject to a terminal disclaimer.

(21) Appl. No.: 17/644,634

(22) Filed: Dec. 16, 2021

(65) Prior Publication Data

US 2022/0108302 A1    Apr. 7, 2022

Related U.S. Application Data

(63) Continuation of application No. 15/827,850, filed on Nov. 30, 2017, now Pat. No. 11,238,439, which is a
(Continued)

(51) Int. Cl.
*G06Q 20/34* (2012.01)
*G06Q 20/40* (2012.01)
*H04L 67/02* (2022.01)

(52) U.S. Cl.
CPC ......... *G06Q 20/351* (2013.01); *G06Q 20/401* (2013.01); *G06Q 20/4012* (2013.01); *H04L 67/02* (2013.01)

(58) Field of Classification Search
None
See application file for complete search history.

(56) References Cited

U.S. PATENT DOCUMENTS

| 5,917,168 A | 6/1999 | Nakamura et al. |
| 6,173,270 B1 | 1/2001 | Cristofich et al. |

(Continued)

FOREIGN PATENT DOCUMENTS

| CN | 103782574 B | 5/2017 | |
| CN | 109964446 A | * 7/2019 | ............. G06N 7/005 |

(Continued)

OTHER PUBLICATIONS

G. A. Lopes Ferreira et al., "Internet of Things and the Credit Card Market: How Companies Can Deal with the Exponential Increase of Transactions with Connected Devices and Can Also be Efficient to Prevent Frauds." https://ieeexplore.ieee.org/document/7113457?source=IQplus (Year: 2015).*

(Continued)

*Primary Examiner* — El Mehdi Oussir
(74) *Attorney, Agent, or Firm* — Bookoff McAndrews, PLLC

(57) ABSTRACT

Technologies for emulating payment transaction messaging for electronic payment transaction include a transaction management controller for receiving a transaction amount for a payment transaction from a business management engine and simulated payment card data for the payment transaction from a point of interaction emulator. The transaction management controller inserts the transaction amount and the payment card data into a test payment authorization request message, which is transmitted to a null host. A payment authorization response message is received from the null host and transmitted by the transaction management controller the business management engine. Other embodiments are described and claimed.

20 Claims, 4 Drawing Sheets

Related U.S. Application Data continuation of application No. 14/990,319, filed on Jan. 7, 2016, now Pat. No. 11,295,293.

(56) References Cited

U.S. PATENT DOCUMENTS

| | | | |
|---|---|---|---|
| 6,612,488 B2 | 9/2003 | Suzuki | |
| 6,714,979 B1* | 3/2004 | Brandt | H04M 15/44 709/227 |
| 7,225,249 B1* | 5/2007 | Barry | G06F 16/958 709/227 |
| 7,290,278 B2* | 10/2007 | Cahill | G06Q 20/0855 713/168 |
| 7,527,194 B2* | 5/2009 | Truitt | G06Q 20/382 235/379 |
| 7,590,595 B2* | 9/2009 | Pessin | G06Q 40/03 705/40 |
| 7,610,240 B2 | 10/2009 | Mintz et al. | |
| 7,775,445 B2 | 8/2010 | Smets et al. | |
| 8,402,521 B2 | 3/2013 | Wendling et al. | |
| 8,554,631 B1* | 10/2013 | Barton | G06Q 20/4016 705/16 |
| 8,589,734 B2 | 11/2013 | Adir et al. | |
| 8,740,617 B1 | 6/2014 | Buten | |
| 8,792,861 B2* | 7/2014 | Drzyzga | G06Q 20/4018 455/410 |
| 9,037,491 B1 | 5/2015 | Lee | |
| 9,098,961 B1 | 8/2015 | Block et al. | |
| 9,235,607 B1 | 1/2016 | Ross et al. | |
| 9,324,098 B1 | 4/2016 | Agrawal et al. | |
| 9,367,430 B1 | 6/2016 | Chee et al. | |
| 9,449,320 B1* | 9/2016 | Walters | G01R 27/28 |
| 9,652,604 B1 | 5/2017 | Johansson et al. | |
| 9,922,322 B2 | 3/2018 | Flurscheim et al. | |
| 9,959,531 B2 | 5/2018 | Purves et al. | |
| 9,965,300 B2 | 5/2018 | Du et al. | |
| 9,972,005 B2 | 5/2018 | Wong et al. | |
| 10,127,409 B1* | 11/2018 | Wade | G06F 21/75 |
| 10,181,120 B1* | 1/2019 | Holmes | G06Q 20/4016 |
| 10,339,513 B1* | 7/2019 | Walters | G06Q 20/40 |
| 10,394,583 B2 | 8/2019 | Lau et al. | |
| 10,489,864 B1 | 11/2019 | Werr | |
| 10,552,840 B2* | 2/2020 | Smets | G06Q 20/401 |
| 10,692,065 B2 | 6/2020 | Han et al. | |
| 10,698,795 B2* | 6/2020 | Riddick | G06Q 20/4016 |
| 10,726,421 B1* | 7/2020 | Bergeon | G06Q 20/40 |
| 10,997,593 B1* | 5/2021 | Karaivanov | G06Q 20/02 |
| 11,017,380 B1* | 5/2021 | Wall | G06Q 20/24 |
| 11,017,393 B2* | 5/2021 | Kumnick | G06Q 20/40 |
| 11,055,695 B2* | 7/2021 | McKee | G06Q 20/401 |
| 11,099,835 B1* | 8/2021 | Wall | G06F 8/61 |
| 11,107,086 B2* | 8/2021 | Fenton | G06Q 20/204 |
| 11,210,190 B1* | 12/2021 | Banks | G06Q 20/405 |
| 2001/0054148 A1 | 12/2001 | Hoornaert et al. | |
| 2003/0052168 A1 | 3/2003 | Wong | |
| 2003/0065931 A1* | 4/2003 | Nakai | G06F 21/79 713/193 |
| 2004/0210776 A1* | 10/2004 | Shah | G06Q 30/02 726/6 |
| 2005/0080581 A1* | 4/2005 | Zimmerman | G11C 29/02 702/117 |
| 2005/0256802 A1 | 11/2005 | Ammermann et al. | |
| 2007/0250920 A1 | 10/2007 | Lindsay | |
| 2007/0265089 A1 | 11/2007 | Robarts et al. | |
| 2007/0282743 A1* | 12/2007 | Lovelett | G06Q 20/102 705/40 |
| 2008/0091944 A1 | 4/2008 | Mueller et al. | |
| 2008/0103951 A1 | 5/2008 | Jung et al. | |
| 2008/0193008 A1 | 8/2008 | Mount et al. | |
| 2008/0198742 A1 | 8/2008 | Kaempfer | |
| 2009/0065571 A1 | 3/2009 | Jain | |
| 2009/0079419 A1* | 3/2009 | Lui | G01R 31/2889 324/762.02 |
| 2009/0144148 A1 | 6/2009 | Jung et al. | |
| 2009/0182654 A1* | 7/2009 | Mullen | G06Q 20/04 707/999.005 |
| 2010/0174620 A1* | 7/2010 | Stringfellow | G06Q 30/0601 705/26.1 |
| 2012/0011016 A1 | 1/2012 | Williams et al. | |
| 2012/0011067 A1* | 1/2012 | Katzin | G06Q 20/40 709/219 |
| 2012/0039469 A1 | 2/2012 | Mueller et al. | |
| 2012/0173436 A1 | 7/2012 | Smith | |
| 2012/0197743 A1 | 8/2012 | Grigg et al. | |
| 2012/0278205 A1* | 11/2012 | Chin | G06Q 10/087 705/28 |
| 2013/0036050 A1 | 2/2013 | Giordano et al. | |
| 2013/0098984 A1 | 4/2013 | Shenker et al. | |
| 2013/0110770 A1 | 5/2013 | Stevelinck | |
| 2013/0212025 A1* | 8/2013 | Tanner | G06Q 20/401 705/44 |
| 2013/0276080 A1 | 10/2013 | Nakonetzki et al. | |
| 2014/0005999 A1 | 1/2014 | Agarwala et al. | |
| 2014/0149293 A1 | 5/2014 | Laracey | |
| 2014/0201076 A1* | 7/2014 | Pacher | G06Q 20/4016 705/44 |
| 2014/0237552 A1 | 8/2014 | Yoo | |
| 2014/0267079 A1 | 9/2014 | Duplan et al. | |
| 2015/0026067 A1* | 1/2015 | Abifaker | H04M 1/00 705/44 |
| 2015/0088746 A1 | 3/2015 | Hoffman | |
| 2015/0120533 A1 | 4/2015 | Jung et al. | |
| 2015/0186871 A1 | 7/2015 | Laracey | |
| 2015/0227923 A1* | 8/2015 | Kutsch | G06Q 20/3224 705/67 |
| 2015/0235212 A1* | 8/2015 | Ortiz | G06Q 20/322 705/44 |
| 2016/0019536 A1 | 1/2016 | Ortiz et al. | |
| 2016/0140026 A1 | 5/2016 | Evans et al. | |
| 2016/0259627 A1* | 9/2016 | Michelsen | G06F 8/35 |
| 2016/0261409 A1 | 9/2016 | French et al. | |
| 2017/0004505 A1* | 1/2017 | Bergeon | G06Q 20/10 |
| 2017/0039549 A1 | 2/2017 | Quentin | |
| 2017/0061437 A1 | 3/2017 | Peng et al. | |
| 2017/0068954 A1 | 3/2017 | Hockey et al. | |
| 2017/0178100 A1* | 6/2017 | Bergeon | G06Q 20/208 |
| 2017/0270604 A1 | 9/2017 | Abela et al. | |
| 2017/0302656 A1 | 10/2017 | Ramatchandirane | |
| 2018/0005243 A1* | 1/2018 | Zovi | G06Q 20/405 |
| 2019/0207953 A1* | 7/2019 | Klawe | G06F 21/57 |
| 2020/0402049 A1 | 12/2020 | Farias et al. | |
| 2021/0117968 A1* | 4/2021 | Bhasin | G06Q 20/20 |
| 2022/0188825 A1* | 6/2022 | Fortney | G06Q 20/351 |

FOREIGN PATENT DOCUMENTS

| | | | | |
|---|---|---|---|---|
| CN | 110268389 A | * | 9/2019 | ............ G06F 11/261 |
| EP | 3185194 A1 | | 6/2017 | |
| KR | 20060022734 A | | 3/2006 | |
| WO | WO-2015065293 A1 | * | 5/2015 | ......... G06Q 20/3224 |
| WO | 2018144036 A1 | | 8/2018 | |
| WO | WO-2021055348 A1 | * | 3/2021 | ............ G06Q 20/20 |
| WO | WO-2023244501 A1 | * | 12/2023 | |

OTHER PUBLICATIONS

Jolly G., et al., Generation of local and expected behaviors of a smart card application to detect software anomaly. https://hal.science/hal-01188609/document (Year: 2015).*

Khosravi et al., Towards model-based testing of electronic funds transfer systems. https://pure.tue.nl/ws/portalfiles/portal/3122614/676683.pdf (Year: 2010).*

A. Adir et al., "Verification of transactional memory in POWER8," 2014 51st ACM/EDAC/IEEE Design Automation Conference (DAC), San Francisco, CA, USA, 2014. https://ieeexplore.ieee.org/document/6881385?source=IQplus (Year: 2014).*

R. Casado, J. Tuya and M. Younas, "An Abstract Transaction Model for Testing the Web Services Transactions," 2011 IEEE International Conference on Web Services, Washington, DC, USA. https://ieeexplore.ieee.org/document/6009415?source=IQplus (Year: 2011).*

(56) References Cited

OTHER PUBLICATIONS

Bond et al. Chip and Skim: cloning EMV cards with the pre-play attack. https://arxiv.org/pdf/1209.2531.pdf (2012).
Design and Implementation of Various Payment System for Product Transaction in Mobile Application. https://ieeexplore.ieee.org/stamp/stamp.jsp?tp=&arnumber=8901643 (2019).
Jiaxin Ou et al., Fast and Failure-Consistent Updates of Application Data in Non-Volatile Main Memory File System. https://ieeexplore.ieee.org/stamp/stamp.jsp?tp=&arnumber=7897078 (2016.

\* cited by examiner

POINT OF INTERACTION DEVICE EMULATION FOR PAYMENT TRANSACTION SIMULATION

CROSS-REFERENCE TO RELATED APPLICATION(S)

This patent application is a continuation of and claims the benefit of priority to U.S. application Ser. No. 15/827,850, filed on Nov. 30, 2017, is a continuation of and claims the benefit of priority to U.S. application Ser. No. 14/990,319, filed Jan. 7, 2016, the entireties of which are incorporated herein by reference.

TECHNICAL FIELD

Embodiments of the technologies described herein relate, in general, to the field of payment transactions. More particularly, the technologies described herein relate to the field of generating payment authorization request messaging for test payment transactions.

BACKGROUND

Merchants accept consumer payments for goods and services through point-of-sale ("POS") terminals and corresponding business applications. Configuring such POS terminals and business applications to accept and process payment transactions is a complex and time consuming process. As electronic payment technologies advance, merchants, integrators, and developers, continually evolve to meet the demands of the changing payment ecosystem. Such evolutions can be in response to seeking to provide consumers with a relatively frictionless purchase event experience in view of the multitude of newly created payment types, changing financial regulations, multi-channel processing, among other variables. In order to confirm functionality and interoperability of hardware-based and software-based products, evaluation and testing is typically performed prior to integration into a merchant's system. In some cases, a new product or system is a software-based offering that can be downloaded and installed for use by merchant point of sale system. In order to test the software-based offering, however, upgraded or different hardware must first be acquired. This situation can pose a dilemma, as it may be desirable to delay capital expenditure on hardware until after the software-based offering has been fully vetted and a determination has been made to acquire the software solution.

SUMMARY

In an embodiment, the present disclosure is directed, in part, to a method for emulating payment transaction messaging for electronic payment transactions, the method includes receiving, by a transaction management controller and from a business management engine, a transaction amount for a test payment transaction, the transaction amount for insertion by the transaction management controller into a test payment authorization request message. The method further includes requesting, by the transaction management controller and from a point of interaction emulator, payment card data for the test payment authorization request message. In addition, the method includes receiving, by the transaction management controller and from the point of interaction emulator, the requested payment card data for insertion by the transaction management controller into the test payment authorization request message. The requested payment card data is simulated payment card data. The method also includes inserting, by the transaction management controller, the payment card data received from the point of interaction emulator and the transaction amount received from the business management engine into the test payment authorization request message. The method further includes transmitting, by the transaction management controller and to a null host, the test payment authorization request message and receiving, by the transaction management controller and from the null host, a payment authorization response message for the test payment authorization request message. The method also includes transmitting, by the transaction management controller and to the business management engine, the test payment authorization response message to the business management engine.

In another embodiment, the present disclosure is directed, in part, to one or more machine-readable storage media including a plurality of instructions stored thereon that in response to being executed by a transaction management controller, cause the transaction management controller to receive, from a business management engine, a transaction amount for a test payment transaction, the transaction amount for insertion by the transaction management controller into a test payment authorization request message. The plurality of instructions further cause the transaction management controller to request, from a point of interaction emulator, payment card data for the test payment authorization request message. The plurality of instructions also cause tire transaction management controller to receive, from the point of interaction emulator, the requested payment card data for insertion by the transaction management controller into the test payment authorization request message and insert the payment card data received from the point of interaction emulator and the transaction amount received from the business management engine into the test payment authorization request message. The requested payment card data is simulated payment card data. In addition, the plurality of instructions further cause the transaction management controller to transmit, to a null host, the test payment authorization request message and receive, from the null host, a payment authorization response message for the test payment authorization request message. The plurality of instructions also cause the transaction management controller to transmit, to the business management engine, the test payment authorization response message.

In another embodiment, the present disclosure is directed, in part, to a system for emulating payment transaction messaging for electronic payment transactions, the system includes a transaction management controller comprising a processor executing instructions stored in memory, wherein the instructions cause the processor to receive, from a business management engine, a transaction amount for a test payment transaction, the transaction amount for insertion by the transaction management controller into a test payment authorization request message. The instructions further cause the processor to request, from a point of interaction emulator, payment card data for the test payment authorization request message. In addition, the instructions cause the processor to receive, from the point of interaction emulator, the requested payment card data for insertion by the transaction management controller into the test payment authorization request message and insert the payment card data received from the point of interaction emulator and the transaction amount received from the business management engine into the test payment authorization request message.

The instructions also cause the processor to transmit, to a null host, the test payment authorization request message and receive, from the null host, a payment authorization response message for the payment authorization request message. In addition, the instructions cause the processor to transmit, to the business management engine, the test payment authorization response message to the business management engine.

BRIEF DESCRIPTION OF THE DRAWINGS

It is believed that certain embodiments will be better understood from the following description taken in conjunction with the accompanying drawings, in which like references indicate similar elements and in which.

DETAILED DESCRIPTION

Figure 1:
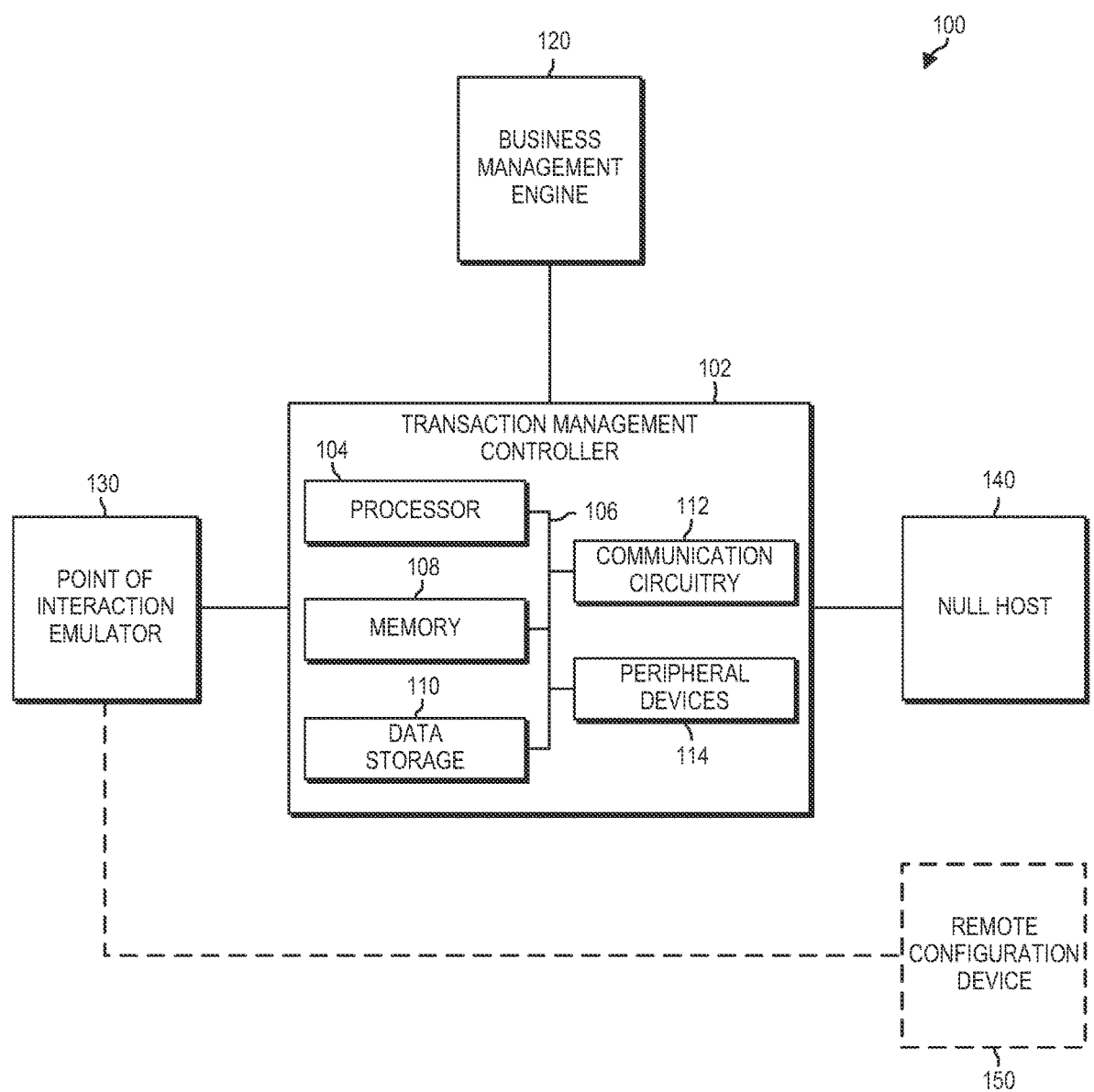
FIG. 1 is a simplified block diagram of at least one embodiment of a system for managing payment authorization request messaging for test payment transactions.

Various non-limiting embodiments of the present disclosure will now be described to provide an overall understanding of the principles of the structure, function, and use of systems and methods disclosed herein. One or more examples of these non-limiting embodiments are illustrated in the selected examples disclosed and described in detail with reference made to the figures in the accompanying drawings. Those of ordinary skill in the art will understand that systems and methods specifically described herein and illustrated in the accompanying drawings are non-limiting embodiments. The features illustrated or described in connection with one non-limiting embodiment may be combined with the features of other non-limiting embodiments. Such modifications and variations are intended to be included within the scope of the present disclosure.

For simplicity, the description that follows will be provided by reference to use of a "payment vehicle" or a "payment card," which generally refers to any type of financial alternative to currency. As is to be clear to those skilled in the art, no aspect of the present disclosure is specifically limited to a specific type of payment vehicle or payment card. Therefore, it is intended that the following description encompasses the use of the present disclosure with regard to testing and emulating many other forms of financial alternatives to currency, including credit cards, debit cards, smart cards, single-use cards, pre-paid cards, electronic currency (such as might be provided through a cellular telephone or personal digital assistant), and the like. The use of various types of payment vehicles or payment cards for testing purposes can include the simulation of traditional plastic transaction cards, radio-frequency enabled transaction cards, chip-based payment cards, or other types of transaction cards, such as credit, charge, debit, pre-paid or stored-value cards, or any other like financial transaction instrument.

As described above, testing software-based offerings can pose a dilemma when upgraded or different hardware must first be acquired before evaluation can occur. For example, various electronic transaction management software applications (such as the transaction management controller described in more detail below) can be downloaded for evaluation by the merchant or affiliated party. In some cases, the electronic transaction management, software application is configured to communicate only with an upgraded point of interaction hardware device (i.e., PIN pad, card reader, etc.). Thus, in order to test the electronic transaction management software application, the evaluator would need to acquire and configure the upgraded hardware device before evaluation could proceed. It would be desirable for a software-based PIN pad emulator that can facilitate the evaluation and testing of various electronic transaction management software applications, without requiring the acquisition of upgraded hardware devices. POI emulators in accordance with the present disclosure beneficially address technical hurdles facing software developers, merchants, and other entities associated with payment ecosystems that need to evaluate, certify, or otherwise advanced payments-related technology that is not necessarily compatible with legacy infrastructure.

As described in more detail below, point of interaction (POI) emulators in accordance with the present disclosure are software-based and therefore can be delivered via electronic transfer. Beneficially, the POI emulators described herein do not require drivers to be installed on the host and do not require setup or configuration. In some embodiments, POI emulators can be controlled externally through commands to produce desired messaging output to electronic transaction management software applications. Therefore, a POI emulator can be used for generating specific transaction scenarios to which the integrator may want develop and test. Further, POI emulators can generate a wide array of payment transaction data, such as such as PIN data, swiped card data, and EMV card data, without requiring physical test cards or other hardware.

Referring now to FIG. 1, in one embodiment, a system 100 for emulating payment transaction messaging for electronic payment transactions includes a transaction management controller 102, a business management engine 120, a point of interaction (POI) emulator 130, and a null host 140. In some embodiments, the system 100 includes a remote configuration device 150. In operation, the transaction management controller 102 receives a payment request from the business management engine 120 in connection with a test payment transaction. The test payment transaction can be initiated, for example, by an integrator, developer, or other type of user wanting to evaluate or assess operation of the transaction management controller 102 and/or the business management engine 120. The payment request includes a transaction amount and can be embodied as a Hypertext Transfer Protocol (HTTP) message. In some embodiments, the business management engine 120 can alternatively or additional provide other information that is relevant to the simulated transaction, such as clerk number, latte number, tax amount, corporate/purchase card data, or other types of data that may be received, processed, or handled during a transaction (i.e., healthcare data, auto rental data, etc.). After receiving the payment request, the transaction management controller 102 requests payment card data (e.g., a payment card number, a payment card type, etc.) for the test payment transaction from the POI emulator 130 (e.g., simulating a card reader, a PIN pad, etc.). In the illustrative embodiment, the POI emulator 130 is a module configured to emulate various communications front a hardware-based POI device.

Once payment card data, which is simulated to emulate data received for an actual payment card-based transaction, is received from the POI emulator 130, the transaction management controller 102 inserts the received transaction amount and the payment card data into a test payment authorization request message. Depending on the type of transaction being simulated, the POI emulator 130 can additionally return other data to the transaction management controller 102, such as tip amount, cashback amount, or other information that can be supplied by a POI device during a transaction. The transaction management controller 102 transmits the test payment authorization request message to the null host 140, which is described in more detail below. A payment authorization response message is then received from the null host 140 in response to the test payment authorization request message. The transaction management controller 102 transmits the received payment authorization response message to the business management engine 120.

The system 100 depicted in FIG. 1 beneficially allows various components of the system, such as the transaction management controller 102 and the business management engine 120, to be tested or examined without required the acquisition of a POI hardware device. Instead, the POI emulator 130 serves appropriate messaging to the transaction management controller 102 so that functionality of the system can be emulated. As described in more detail below, the POI emulator 130 can selectively serve a variety of messages such that an array of example payment vehicle types and transactions can be emulated.

In some embodiments, the functionality of the POI emulator 130 can be controlled or configured to simulate various transaction types. For example, the POI emulator 130 can be configured, via HTTP commands, to simulate various payment transaction processing features (e.g., signature prompting features, PIN entry features, etc.). In some embodiments, the POI emulator 130 can simulate functionality associated with non-payment related features of various POI devices, such as loyalty card reading, driver license number input, among other features.

The transaction management controller 102 can be embodied as any type of computing device or server or capable of processing, communicating, storing, maintaining, and transferring data. For example, the transaction management controller 102 can be embodied as a server, a microcomputer, a minicomputer, a mainframe, a desktop computer, a laptop computer, a mobile computing device, a handheld computer, a smart phone, a tablet computer, a personal digital assistant, a telephony device, a custom chip, an embedded processing device, or other computing device and/or suitable programmable device. In some embodiments, the transaction management controller 102 can be embodied as a computing device integrated with other systems or subsystems. The transaction management controller 102 can be downloaded from a third party repository for execution on a merchant computing system, for example. In the illustrative embodiment of FIG. 1, the transaction management controller 102 includes a processor 104, a system bus 106, a memory 108, a data storage 110, communication circuitry 112, and one or more peripheral devices 114. Of course, the transaction management controller 102 can include other or additional components, such as those commonly found in a server and/or computer (e.g., various input/output devices), in other embodiments. Additionally, in some embodiments, one or more of the illustrative components can be incorporated in, or otherwise from a portion of, another component. For example, the memory 108, or portions thereof, can be incorporated in the processor 104 in some embodiments. Furthermore, it should be appreciated that the transaction management controller 102 can include other components, sub-components, and devices commonly found in a computer and/or computing device, which are not illustrated in FIG. 1 for clarity of the description.

The processor 101 can be embodied as any type of processor capable of performing the functions described herein. For example, the processor 104 can be embodied as a single or multi-core processor, a digital signal processor, microcontroller, a general purpose central processing unit (CPU), a reduced instruction set computer (RISC) processor, a processor having a pipeline, a complex instruction set computer (CISC) processor, an application specific integrated circuit (ASIC), a programmable logic device (PLD), a field programmable gate array (FPGA), or other processor or processing/controlling circuit or controller.

In various configurations, the transaction management controller 102 includes a system bus 106 for interconnecting the various components of the transaction management controller 102. The system bus 106 can be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations with the processor 104, the memory 108, and other components of the transaction management controller 102. In some embodiments, the transaction management controller 102 can be integrated into one or more chips such as a programmable logic device or an application specific integrated circuit (ASIC). In such embodiments, the system bus 106 can form a portion of a system-on-a-chip (SoC) and be incorporated, along with the processor 104, the memory 108, and other components of the transaction management controller 102, on a single integrated circuit chip.

The memory 108 can be embodied as any type of volatile or non-volatile memory or data storage capable of performing the functions described herein. For example, the memory 108 can be embodied as read only memory (ROM), random access memory (RAM), cache memory associated with the processor 104, or other memories such as dynamic RAM (DRAM), static ram (SRAM), programmable ROM (PROM), electrically erasable PROM (EEPROM), flash memory, a removable memory card or disk, a solid state drive, and so forth. In operation, the memory 108 can store various data and software used during operation of the transaction management controller 102 such as operating systems, applications, programs, libraries, and drivers.

The data storage 110 can be embodied as any type of device or devices configured for short-term or long-term storage of data such as, for example, memory devices and circuits, memory cards, hard disk drives, solid-state drives, or other data storage devices. For example, in some embodiments, the data storage 110 includes storage media such as a storage device that can be configured to have multiple modules, such as magnetic disk drives, floppy drives, tape drives, hard drives, optical drives and media, magneto-optical drives and media, compact disc drives, Compact Disc Read Only Memory (CD-ROM), Compact Disc Recordable (CD-R). Compact Disc Rewriteable (CD-RW), a suitable type of Digital Versatile Disc (DVD) or Blu-Ray disc, and so forth. Storage media such as flash drives, solid state hard drives, redundant array of individual disks (RAID), virtual drives, networked drives and other memory means including storage media on the processor 104, or the memory 108 are also contemplated as storage devices. It should be appreciated that such memory can be internal or external with respect to operation of the disclosed embodiments. It should also be appreciated that certain portions of the processes described herein can be performed using instructions stored on a computer-readable medium or media that direct or otherwise instruct a computer system to perform the process steps. Non-transitory computer-readable media, as used herein, comprises all computer-readable media except for transitory, propagating signals.

In some embodiments, the data storage device 110 can be configured to store a set of local payment processing features of the transaction management controller 102. Each feature can be configured to provide different functionality of the transaction management controller 102 and/or the POI emulator 130. As such, each feature can be toggled "on" or toggled "off" to control the features provided by the transaction management controller 102 and/or the POI emulator 130. The local payment processing features can include device configuration features and/or settings (e.g., listening port settings, security settings, user settings, etc.), transaction professing features and/or settings (e.g., partial approval features, transaction amount confirmation features, cashback features, accepted payment card settings, supported language settings, transaction gratuity features, signature requirement features, transaction store and forward features, etc.), multilane features and/or settings (e.g., lane identification features, lane initialization settings, etc.), POI emulator 130 features and/or settings (e.g., terminal type settings, driver configurations, communication settings, etc.), and any other type of payment processing feature or configuration setting for the transaction management controller 102 or a device controlled or managed thereby (e.g., the POI emulator 130).

The communication circuitry 112 of the transaction management controller 102 can be embodied as any type of communication circuit, device, interface, or collection thereof, capable of enabling communications between the transaction management controller 102 and the business management engine 120, POI emulator 130, null host 140, remote configuration device 150, and/or any other computing device communicatively coupled thereto. For example, the communication circuitry 112 can be embodied as one or more network interface controllers (NICs), in some embodiments. The communication circuitry 112 may be configured to use any one or more communication technologies (e.g., wireless or wired communications) and associated protocols (e.g., Ethernet, Wi-Fi®, WiMAX, etc.) to effect such communication.

In some embodiments, the transaction management controller 102, business management engine 120, POI emulator 130, null host 140, remote configuration device 150, and/or any other computing devices of the system 100, can communicate with each other over one or more networks. The network(s) can be embodied as any number of various wired and/or wireless communication networks. For example, the network(s) can be embodied as or otherwise include a local area network (LAN), a wide area network (WAN), a cellular network, or a publicly-accessible, global network such as the Internet. Additionally, the network(s) can include any number of additional devices to facilitate communication between the computing devices of the system 100. In other embodiments, some or all of the transaction management controller 102, business management engine 120, POI emulator 130, and null host 140 are installed and operate local to a computing device, such as a merchant point of sale management computing device.

Additionally, in some embodiments, the transaction management controller 102 can further include one or more peripheral devices 114. Such peripheral devices 114 can include any type of peripheral device commonly found in a computing device such as additional data storage, speakers, a hardware keyboard, a keypad, a gesture or graphical input device, a motion input device, a touchscreen interface, one or more displays, an audio unit, a voice recognition unit, a vibratory device, a computer mouse, a peripheral communication device, and any other suitable user interface, input/output device, and/or other peripheral device.

The business management engine 120 can be embodied as any type of computing device capable of performing the functions described herein. As such, the business management engine 120 can include devices and structures commonly found in computing devices such as processors, memory devices, communication circuitry, and data storages, which are not shown in FIG. 1 for clarity of the description. The business management engine 120 can be configured to perform certain business-related functions, such as, without limitation, inventory management, scheduling, accounting processes, payroll, and the like. As is to be appreciated, the particular business-related functions facilitated by a business management engine may depend on the needs of the particular business (e.g., merchant) utilizing the business management engine. In this regard, a business management engine of a salon can provide different business-related functions than that of a specialty retailer, for example. In some embodiments, the business management engine 120 is configured to initiate payment transactions. As discussed in more detail below, the business management engine 120 is configured to communicate with the transaction management controller 102 to facilitate such payment transactions. For example, in some embodiments, the business management engine 120 is configured to transmit a payment request to the transaction management controller 102, either for a simulated transaction or a test transaction. The payment request can be embodied as an HTTP message that includes the amount of the transaction. Additionally, the business management engine 120 can be configured to receive a payment authorization response message from the transaction management controller 102. As discussed in more detail below, the business management engine 120 can be communicatively isolated from the POI emulator 130 (e.g., not in direct communication with the POI emulator 130). As such, instead of being directly connected to the POI emulator 130, the business management engine 120 is communicatively coupled to the transaction management controller 102, which manages communications with the POI emulator 130. It should be appreciated that in doing so, the complexity of configuring (e.g., coding, certification, initialization, etc.) of the business management engine 120 is reduced.

The point of interaction (POI) emulator 130 can be embodied as software module capable of performing the functions described herein. In some embodiments, the POI emulator 130 is downloaded from a third party repository along with the transaction management controller 102, such that the POI emulator 130 can be executed during evaluation or testing of the transaction management controller 102.

For example, in the illustrative embodiment, the POI emulator 130 can be configured to emulate a card reader, PIN pad, or any other type of point of interaction device that is configured to facilitate receipt of a payment card for a payment transaction (e.g., a credit or debit transaction). In some embodiments, the POI emulator 130 is communicatively isolated from the business management engine 120 such that communication messaging is sent between the POI emulator 130 and the transaction management controller 102.

The null host 140 can be, for example, an emulator of a network of a payment card network affiliated with a payment vehicle or payment card. The null host 140 can be configured to emulate any of a number of credit card associations, including VISA, MASTERCARD, DISCOVER, and AMERICAN EXPRESS. In some embodiments, during a test transaction, the null host 140 receives a test payment authorization request message from the transaction management controller 102 for the test payment transaction. The null host 140 can be hosted by or otherwise a component of the transaction management controller 102. In other embodiments, the null host 140 can be hosted by a payment gateway, an acquirer processor, or other payment entity that is accessible via network communications. For example, a payment gateway can provide a production host and a certification host. During testing, the certification host can be provided as the null host to receive and respond to test transactions transmitted by the transaction management controller 102. In response to receiving the test payment authorization response message, the null host 140 can transmit the test payment authorization response message to the transaction management controller 102.

The remote configuration device 150 can be embodied as any type of computing device capable of performing the functions described herein. As such, the remote configuration device 150 can include devices and structures commonly found in computing devices such as processors, memory devices, communication circuitry, and data storages, which are not shown in FIG. 1 for clarity of the description. In some embodiments, the remote configuration device 150 is configured to configure and/or manage payment processing features of the POI emulator 130, and/or other devices of the system 100 (e.g., the transaction management controller 102). To do so, the remote configuration device 150 can generate one or more feature modification message, which can be transmitted to the POI emulator 130. As discussed in more detail below, the feature modification message can include configuration data, which can be used to control the type of payment transaction simulated by the POI emulator 130 or otherwise modify the performance of the POI emulator 130.

In some embodiments, the transaction management controller 102, the business management engine 120, the point of interaction emulator 130, the null host 140 (or computing devices thereof), and the remote configuration device 150 can each establish an environment during operation. Each environment can include various modules, components, sub-components, and devices commonly found in computing devices, which are not illustrated in the figures for clarity of the description. The various modules, components, sub-components, and devices of each environment can be embodied as hardware, firmware, software, or a combination thereof. For example, one or more of the modules, components, sub-components, and devices of each environment can be embodied as a processor and/or a controller configured to provide the functionality described herein.

Figure 2:
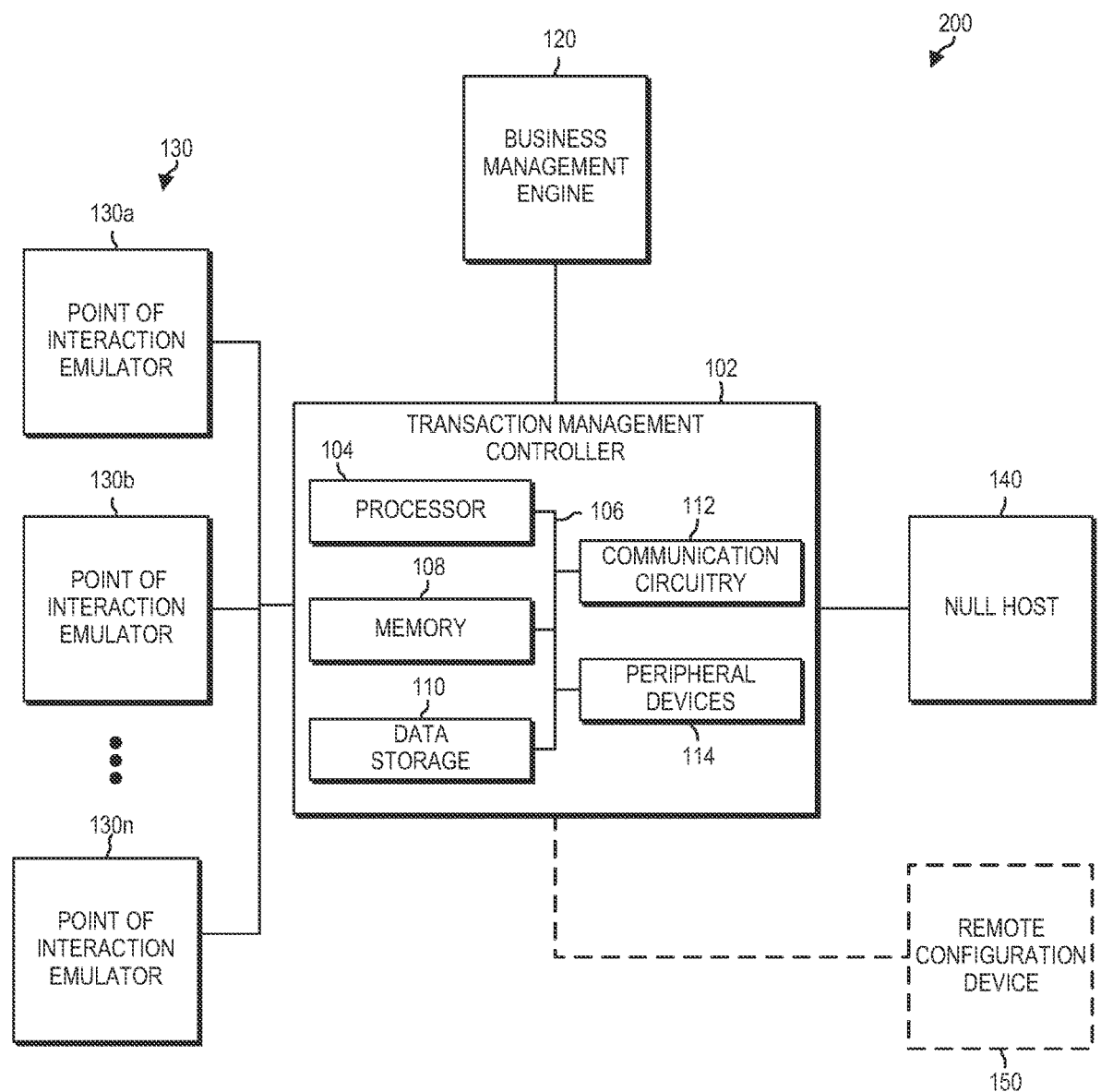
FIG. 2 is a simplified block diagram of at least one embodiment of a system for managing payment authorization request messaging for multi-lane test payment transactions.

Referring now to FIG. 2, in an embodiment, a system 200 for emulating payment transaction messaging for multi-lane payment transactions includes the transaction management controller 102, the business management engine 120, multiple point of interaction (POI) emulators 130 (e.g., the POI emulator 130a, POI emulator 130b, POI emulator 130n, etc.), and the null host 140. In some embodiments, the system 200 includes the remote configuration device 150.

In multi-lane environments, each of a plurality of point of interaction devices can communicate with a central transaction management controller 102. As illustratively shown, the transaction management controller 102 can manage and, therefore, be communicatively coupled to multiple POI emulators 130 so that these operational environments can be evaluated. Each POI emulator 130 (e.g., the POI emulator 130a. POI emulator 130b, POI emulator 130n, etc.) of the system 200 can be embodied to emulate a different lane in a multi-lane environment. Features associated with each lane can be individual set (e.g., lane identification features, lane initialization settings, etc.) to evaluate functionality of the transaction management controller 102 and/or the business management engine 120 can be evaluated using multi-lane configuration parameters.

Figure 3:
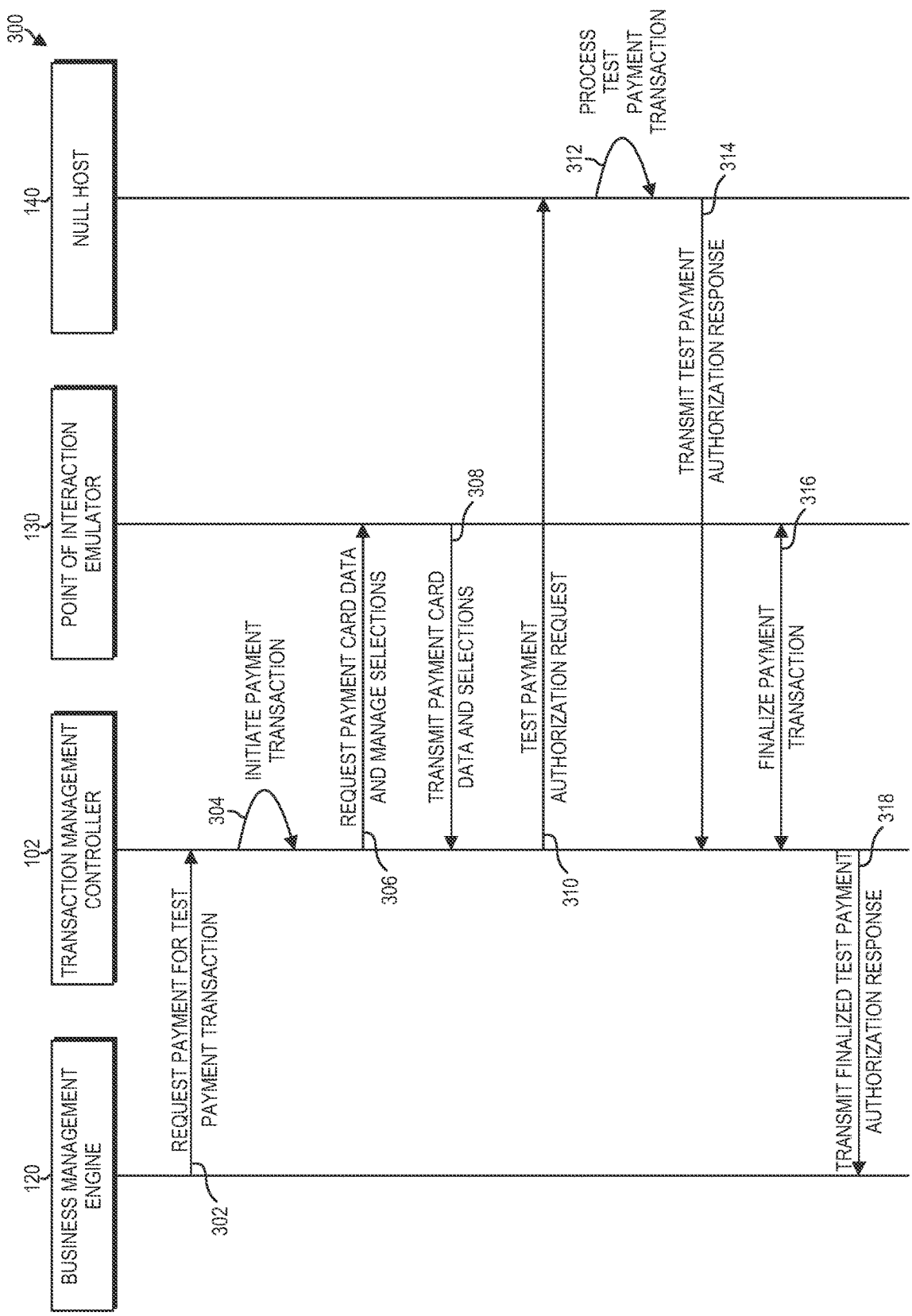
FIG. 3 is a simplified sequence flow diagram in accordance with at least one non-limiting embodiment.

Referring now to FIG. 3, a process 300 that can be executed by the devices of the system 100 begins with process How 302. In process flow 302, the business management engine 120 transmits a payment request for a test payment transaction to the transaction management controller 102. The payment request 302 can be a simulation generated by the business management engine 120 for testing purposes. The payment request includes a transaction amount and can be embodied as a Hypertext Transfer Protocol (HTTP) message. In embodiments in which the payment request is an HTTP message, the payment request can be embodied as an HTTP POST request or an HTTP PUT request. In such embodiments, one or more payment request parameters (e.g., transaction amount, payment type, etc.) can be sent to the transaction management controller 102 within a body of the message sent to the transaction management controller 102. Additionally or alternatively, the payment request can be embodied as an HTTP GET request or an HTTP DELETE request. In such embodiments, one or more of the payment request parameters can be sent to the transaction management controller 102 within a uniform resource locator (URL) that corresponds to the transaction management controller 102. Next, in process flow 304, the transaction management controller 102 initiates a test payment transaction based at least in part on, or otherwise as a function of, the received payment request.

Subsequently, in process flow 306, the transaction management controller 102 requests test payment card data for the initiated payment transaction from the POI emulator 130. In some embodiments, in process flow 306, the transaction management controller 102 additionally manages payment selection options of the POI emulator 130. Additionally, as discussed above, the transaction management controller 102 can control other features and/or functions of the POI emulator 130 corresponding to a payment transaction.

In process flow 308, the POI emulator 130 transmits the payment card data to the transaction management controller 102. The payment card data can be configured to simulate any of a variety of payment card transaction, such as a swiped card entry, a contactless payment card entry, or a keyed entry. Further the POI emulator 130 can be configured to simulate encrypted data, unencrypted data, encrypted PIN data, as well as other types of cardholder interaction scenarios, such as cashback requests, amount confirmation, and signature capture. The simulated payment card data can be generated by the POI emulator 130 in response to receipt of the request from the transaction management controller 102. Additionally, in embodiments in which the transaction management controller 102 manages the payment selection options provided to the consumer during the payment transaction, the selected options can be transmitted by the POI 130 to the transaction management controller 102.

Subsequently, in process flow 310, the transaction management controller 102 transmits transaction data for the payment transaction to the null host 140 for processing. To do so, the transaction management controller inserts or incorporates the transaction amount received from the business management engine 120 and the simulated payment card data received from the POI emulator 130 into a test payment authorization request message. In some embodiments, the payment authorization request message can be embodied as a HTTP message. Additionally, in some embodiments, the null host 140 is hosted locally by the transaction management controller 102.

In process flow 312, the null host 140 processes the test payment transaction based on the test payment authorization request message received from the transaction management controller 102. As discussed, the null host 140 is configured to receive and generate a response to the test payment authorization response message. In process flow 314, the null host 140 transmits the test payment authorization response message to the transaction management controller 102.

Subsequently, in process flow 316, the transaction management controller 102 and the POI emulator 130 finalize the payment transaction. For example, in some embodiment, the transaction management controller 102 can instruct the POI emulator 130 to simulate the capture of a signature for the test payment transaction.

Additionally or alternatively, in some embodiments, POI emulator 130 can emulate an integrated circuit payment card reader. In such embodiments, the transaction management controller 102 can instruct the POI emulator 130 to write payment transaction data or account data back to a simulated integrated circuit payment card. It should be appreciated that the transaction management controller 102 and the POI emulator 130 can perform any other function to finalize the test payment transaction.

In process flow 318, the transaction management controller 102 transmits the finalized test payment authorization response message to the business management engine 120. In some embodiments, the business management engine 120 generates a receipt for the payment transaction based at least in part on, or otherwise as a function of, the finalized payment authorization response message received from the transaction management controller 102.

Figure 4:
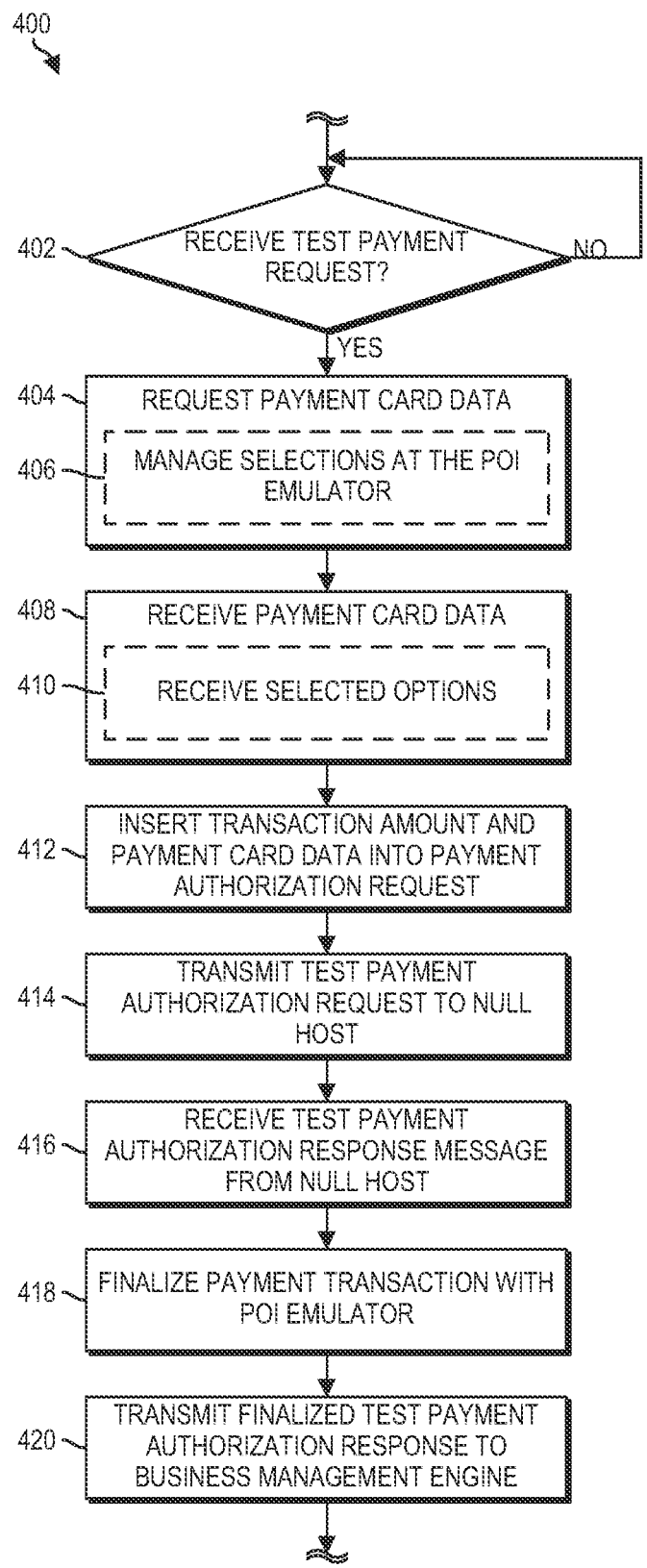
FIG. 4 is a simplified flow diagram of at least one embodiment of a method that may be executed by the transaction management controller of FIG. 1 for managing payment authorization request messaging for test payment transactions.

Referring now to FIG. 4, a method 400 that can be executed by the transaction management controller 102 for emulating payment transaction messaging for electronic payment transactions begins with decision block 402. In decision block 402, the transaction management controller 102 determines whether a test payment request for a test payment transaction is received from the business management engine 120. The test payment request can include a transaction amount and can be embodied as a Hypertext Transfer Protocol (HTTP) message. If, in decision block 402, the transaction management controller 102 determines that a test payment request is received, the method 400 advances to block 404. If, however, the transaction management controller 102 determines instead that a test payment request is not received, the method 400 loops back to decision block 402 and the transaction management controller 102 continues monitoring for receipt of a test payment request.

In block 404, the transaction management controller 102 requests payment card data for the payment transaction from the POI emulator 130. In some embodiments, in block 406, the transaction management controller manages selection options of the POI emulator 130 for the payment transaction.

In block 408, the transaction management controller 102 receives the requested payment card data from the POI emulator 130. In some embodiments, the received payment card data includes a simulated payment card number associated with a simulated payment card used for the test payment transaction. It should be appreciated, however, that the simulated payment card data can be configured to include any other type of data associated with a payment transaction. In some embodiments, in block 410, the transaction management controller 102 receives any simulated payment options as can be selected by a simulated consumer via the POI emulator 130.

In block 412, the transaction management controller 102 inserts or otherwise incorporates the transaction amount received from the business management engine 120 and the payment card data (e.g., the simulated payment card number, etc.) received from the POI emulator 130 into a test payment authorization request message. In some embodiments, the test payment authorization request message can be embodied as a HTTP message. It should be appreciated, however, that the test payment authorization request message can be embodied as any other type of message, in other embodiments.

In block 414, the transaction management controller 102 transmits the test payment authorization request message to the null host 140. As discussed, the null host 140 can be provided by a payment gateway communicatively coupled thereto configured to facilitate the transaction management controller 102 in processing test payment transactions, in some embodiments. In other embodiments, the null host 140 is hosted locally to the transaction management controller 102. Based on the test payment authorization request message, the null host 140 can generate a test payment authorization response message. In block 416, the transaction management controller 102 receives the test payment authorization response message from the null host 140. In some embodiments, the test payment authorization response message can be embodied as a HTTP message. It should be appreciated, however, that the test payment authorization response message can be embodied as any other type of message, in other embodiments.

Subsequently, in block 418, the transaction management controller 102 finalizes the test payment transaction. For example, in some embodiments, the transaction management controller 102 can instruct the POI emulator 130 to simulate capture of a signature for the test payment transaction. In such embodiments, the transaction management controller 102 can receive simulated captured signature data from the POI emulator 130. Additionally, in such embodiments, the test payment authorization response message can be modified or augmented to include a byte array of the captured signature data.

In block 420, the transaction management controller 102 transmits the finalized payment authorization response message to the business management engine 120. In some embodiments, the business management engine 120 generates a receipt for the payment transaction based at least in part on, or otherwise as a function of, the finalized payment authorization response message received from the transaction management controller 102. In such embodiments, the business management engine 120 can be configured to print the generated receipt via a receipt printer communicatively coupled thereto.

The systems, apparatuses, devices, and methods disclosed herein are described in detail by way of examples and with reference to the figures. The examples discussed herein are examples only and are provided to assist in the explanation of the apparatuses, devices, systems and methods described herein. None of the features or components shown in the drawings or discussed below should be taken as mandatory for any specific implementation of any of these the apparatuses, devices, systems or methods unless specifically designated as mandatory. In addition, elements illustrated in the figures are not necessarily drawn to scale for simplicity and clarity of illustration. For ease of reading and clarity, certain components, modules, or methods may be described solely in connection with a specific figure. In this disclosure, any identification of specific techniques, arrangements, etc. are either related to a specific example presented or are merely a general description of such a technique, arrangement, etc. Identifications of specific details or examples are not intended to be, and should not be, construed as mandatory or limiting unless specifically designated as such. Any failure to specifically describe a combination or sub-combination of components should not be understood as an indication that any combination or sub-combination is not possible. It will be appreciated that modifications to disclosed and described examples, arrangements, configurations, components, dements, apparatuses, devices, systems, methods, etc. can be made and may be desired for a specific application. Also, for any methods described, regardless of whether the method is described in conjunction with a flow diagram, it should be understood that unless otherwise specified or required by context, any explicit or implicit ordering of steps performed in the execution of a method does not imply that those steps must be performed in the order presented but instead may be performed in a different order or in parallel.

Reference throughout the specification to "various embodiments," "some embodiments," "one embodiment," "some example embodiments," "one example embodiment," or "an embodiment" means that a particular feature, structure, or characteristic described in connection with any embodiment is included in at least one embodiment. Thus, appearances of the phrases "in various embodiments." "in some embodiments." "in one embodiment," "some example embodiments," "one example embodiment, or" "in an embodiment" in places throughout the specification are not necessarily all referring to the same embodiment. Furthermore, the particular features, structures or characteristics may be combined in any suitable manner in one or more embodiments.

Throughout this disclosure, references to components or modules generally refer to items that logically can be grouped together to perform a function or group of related functions. Like reference numerals are generally intended to refer to the same or similar components. Components and modules can be implemented in software, hardware, or a combination of software and hardware. The term "software" is used expansively to include not only executable code, for example machine-executable or machine-interpretable instructions, but also data structures, data stores and computing instructions stored in any suitable electronic format, including firmware, and embedded software. The terms "information" and "data" are used expansively and includes a wide variety of electronic information, including executable code; content such as text, video data, and audio data, among others; and various codes or flags. The terms "information," "data," and "content" are sometimes used interchangeably when permitted by context. It should be noted that although for clarity and to aid in understanding some examples discussed herein might describe specific features or functions as part of a specific component or module, or as occurring at a specific layer of a computing device (for example, a hardware layer, operating system layer, or application layer), those features or functions may be implemented as part of a different component or module or operated at a different layer of a communication protocol stack Those of ordinary skill in the art will recognize that the systems, apparatuses, devices, and methods described herein can be applied to, or easily modified for use with, other types of equipment, can use other arrangements of computing systems such as client-server distributed systems, and can use other protocols, or operate at other layers in communication protocol stacks, than are described.

Some of the figures can include a flow diagram. Although such figures can include a particular logic flow, it can be appreciated that the logic flow merely provides an exemplary implementation of the general functionality. Further, the logic flow does not necessarily have to be executed in the order presented unless otherwise indicated. In addition, the logic flow can be implemented by a hardware element, a software element executed by a computer, a firmware element embedded in hardware, or any combination thereof.

The foregoing description of embodiments and examples has been presented for purposes of illustration and description. It is not intended to be exhaustive or limiting to the forms described. Numerous modifications are possible in light of the above teachings. Some of those modifications have been discussed, and others will be understood by those skilled in the art. The embodiments were chosen and described in order to best illustrate principles of various embodiments as are suited to particular uses contemplated. The scope is, of course, not limited to the examples set forth herein, but can be employed in any number of applications and equivalent devices by those of ordinary skill in the art. Rather it is hereby intended the scope of the invention to be defined by the claims appended hereto.

The invention claimed is:

1. A computer-implemented method of emulating transaction messaging for electronic transactions using a payment transaction emulation system, the method comprising:
   receiving, by a transaction controller of the payment transaction emulation system and from a merchant computing system, a transaction prompt for a test transaction;
   receiving, by the transaction controller and from a point of interaction emulator of the payment transaction emulation system, simulated transaction data generated according to a predetermined transaction scenario associated with the transaction prompt;
   inserting, by the transaction controller, the simulated data received into a test request message;
   transmitting, by the transaction controller and to a null host, the test request message;
   receiving, by the transaction controller and from the null host, a test response message in response to the test request message; and
   transmitting, by the transaction controller and to the merchant computing system, the test response message.

2. The computer-implemented method of claim 1, wherein the simulated transaction data includes a simulated personal identification number.

3. The computer-implemented method of claim 1, wherein the simulated transaction data includes data captured using a simulated user interaction with the point of interaction emulator.

4. The computer-implemented method of claim 1, further comprising: determining, by the transaction controller, that the simulated transaction data meets a set of specification data of a technical standard.

5. The computer-implemented method of claim 4, wherein the simulated transaction data includes at least one of a simulated personal identification number, a first set of simulated data from a simulated user interaction with the point of interaction emulator, and/or a second set of simulated data meeting the set of specification data of the technical standard.

6. The computer-implemented method of claim 1, wherein the test request message and the test response message are comprised of Hypertext Transfer Protocol messages.

7. The computer-implemented method of claim 1, further comprising: receiving, by the transaction controller and from the point of interaction emulator, simulated captured signature data, wherein the test response message transmitted to the merchant computing system comprises a byte array including the simulated captured signature data.

8. A non-transitory machine-readable storage media comprising a plurality of instructions stored thereon that in response to being executed by a processor of a transaction controller of a payment transaction emulation system, cause the processor of the transaction controller to perform operations comprising:
   receiving, by the transaction controller of the payment transaction emulation system and from a merchant computing system, a transaction prompt for a test transaction,
   receiving, by the transaction controller and from a point of interaction emulator of the payment transaction emulation system, simulated transaction data generated according to a predetermined transaction scenario associated with the transaction prompt;
   inserting, by the transaction controller, the simulated data received into a test request message;
   transmitting, by the transaction controller and to a null host, the test request message;
   receiving, by the transaction controller and from the null host, a test response message in response to the test request message; and
   transmitting, by the transaction controller and to the merchant computing system, the test response message.

9. The non-transitory machine-readable storage media of claim 8, wherein the simulated transaction data includes a simulated personal identification number.

10. The non-transitory machine-readable storage media of claim 8, wherein the simulated transaction data includes data captured using a simulated user interaction with the point of interaction emulator.

11. The non-transitory machine-readable storage media of claim 8, wherein the operations further include: determining, by the transaction controller, that the simulated transaction data meets a set of specification data of a technical standard.

12. The non-transitory machine-readable storage media of claim 11, wherein the simulated transaction data includes at least one of a simulated personal identification number, a first set of simulated data from a simulated user interaction with the point of interaction emulator, and/or a second set of simulated data meeting the set of specification data of the technical standard.

13. The non-transitory machine-readable storage media of claim 8, wherein the test request message and the test response message are comprised of Hypertext Transfer Protocol messages.

14. The non-transitory machine-readable storage media of claim 8, wherein the operations further include: receiving, by the transaction controller and from the point of interaction emulator, simulated captured signature data, wherein the test response message transmitted to the merchant computing system comprises a byte array including the simulated captured signature data.

15. A payment transaction emulation system for emulating transaction messaging for electronic transactions, the system comprising:
   a transaction controller comprising a processor executing instructions stored in memory, wherein the instructions cause the processor to perform operations including:
   receiving, by the transaction controller of the payment transaction emulation system and from a merchant computing system, a transaction prompt for a test transaction;
   receiving, by the transaction controller and from a point of interaction emulator of the payment transaction emulation system, simulated transaction data generated according to a predetermined transaction scenario associated with the transaction prompt;
   inserting, by the transaction controller, the simulated data received into a test request message;
   transmitting, by the transaction controller and to a null host, the test request message;
   receiving, by the transaction controller and from the null host, a test response message in response to the test request message; and
   transmitting, by the transaction controller and to the merchant computing system, the test response message.

16. The payment transaction emulation system of claim 15, wherein the simulated transaction data includes data captured using a simulated user interaction with the point of interaction emulator.

17. The payment transaction emulation system of claim 15, wherein the instructions further cause the processor to perform the operations including: determining, by the transaction controller, that the simulated transaction data meets a set of specification data of a technical standard.

18. The payment transaction emulation system of claim 17, wherein the simulated transaction data includes at least one of a simulated personal identification number, a first set of simulated data from a simulated user interaction with the point of interaction emulator, and/or a second set of simulated data meeting the set of specification data of the technical standard.

19. The payment transaction emulation system of claim 15, wherein the test request message and the test response message are comprised of Hypertext Transfer Protocol messages.

20. The payment transaction emulation system of claim 15, wherein the instructions further cause the processor to perform the operations including: receiving, by the transaction controller and from the point of interaction emulator, simulated captured signature data, wherein the test response message transmitted to the merchant computing system comprises a byte array including the simulated captured signature data.

* * * * *

UNITED STATES PATENT AND TRADEMARK OFFICE
CERTIFICATE OF CORRECTION

| | |
|---|---|
| PATENT NO. | : 12,086,789 B2 |
| APPLICATION NO. | : 17/644634 |
| DATED | : September 10, 2024 |
| INVENTOR(S) | : Chance Ulrich |

Page 1 of 1

It is certified that error appears in the above-identified patent and that said Letters Patent is hereby corrected as shown below:

In the Specification

Column 1, Line 11, after "2017," insert --which--.

Signed and Sealed this
Twenty-ninth Day of October, 2024

Katherine Kelly Vidal
*Director of the United States Patent and Trademark Office*